US008805950B1

(12) United States Patent
Landsman et al.

(10) Patent No.: US 8,805,950 B1
(45) Date of Patent: Aug. 12, 2014

(54) CLIENT WEB CACHE

(75) Inventors: Richard A. Landsman, Scotts Valley, CA (US); Sailu Reddy, Santa Cruz, CA (US)

(73) Assignee: AOL Inc., Dulles, VA (US)

( * ) Notice: Subject to any disclaimer, the term of this patent is extended or adjusted under 35 U.S.C. 154(b) by 606 days.

(21) Appl. No.: 12/026,772

(22) Filed: Feb. 6, 2008

Related U.S. Application Data

(60) Provisional application No. 60/971,843, filed on Sep. 12, 2007.

(51) Int. Cl.
G06F 15/167 (2006.01)
G06F 15/16 (2006.01)
G06F 15/173 (2006.01)

(52) U.S. Cl.
USPC .......................... 709/213; 709/217; 709/238

(58) Field of Classification Search
USPC .......................................... 709/213, 217, 238
See application file for complete search history.

(56) References Cited

U.S. PATENT DOCUMENTS

| 6,026,474 | A  | * | 2/2000  | Carter et al. ................... 711/202 |
| 6,098,096 | A  | * | 8/2000  | Tsirigotis et al. ............. 709/213 |
| 6,112,231 | A  | * | 8/2000  | DeSimone et al. ........... 709/213 |
| 6,314,492 | B1 | * | 11/2001 | Allen et al. ................... 711/135 |
| 6,327,614 | B1 | * | 12/2001 | Asano et al. .................. 709/213 |
| 6,766,422 | B2 | * | 7/2004  | Beyda ........................... 711/137 |
| 7,194,506 | B1 | * | 3/2007  | White et al. .................. 709/203 |
| 7,194,522 | B1 | * | 3/2007  | Swildens et al. ............. 709/217 |
| 7,483,941 | B2 | * | 1/2009  | Carlson et al. ................ 709/203 |
| 7,941,609 | B2 | * | 5/2011  | Almog ........................... 711/137 |
| 7,954,055 | B2 | * | 5/2011  | Sylthe ............................. 715/273 |
| 2001/0056416 | A1 | * | 12/2001 | Garcia-Luna-Aceves ........ 707/2 |
| 2002/0026517 | A1 | * | 2/2002  | Watson, Jr. ................... 709/228 |
| 2002/0107934 | A1 | * | 8/2002  | Lowery et al. ................ 709/213 |
| 2002/0184441 | A1 | * | 12/2002 | Wong et al. ................... 711/113 |
| 2002/0198953 | A1 | * | 12/2002 | O'Rourke et al. ............ 709/213 |
| 2003/0005038 | A1 | * | 1/2003  | Codella et al. ................ 709/203 |
| 2005/0154781 | A1 | * | 7/2005  | Carlson et al. ................ 709/203 |
| 2005/0216519 | A1 | * | 9/2005  | Mayo et al. ................... 707/200 |
| 2007/0067382 | A1 | * | 3/2007  | Sun ................................ 709/203 |
| 2007/0130304 | A1 | * | 6/2007  | Fuller et al. .................. 709/223 |
| 2008/0046575 | A1 | * | 2/2008  | Bouazizi ........................ 709/228 |
| 2008/0201331 | A1 | * | 8/2008  | Eriksen et al. .................. 707/10 |
| 2009/0106381 | A1 | * | 4/2009  | Kasriel et al. ................. 709/206 |

* cited by examiner

*Primary Examiner* — Rupal Dharia
*Assistant Examiner* — Joe Chacko
(74) *Attorney, Agent, or Firm* — Finnegan, Henderson, Farabow, Garrett & Dunner, LLP

(57) ABSTRACT

A method and system for improving data access times for a client system located remote from a central server. One example system includes the client system, the central server, and a client web cache located in close geographical proximity to the client system. The central server receives data requests from the client system and retrieves the data from the appropriate data source. The central server also sends the requested data and scripts to the local client web cache for instructing the client web cache to store the cache data. Alternatively, client web cache may have received a prior one-time instruction to cache predetermined types of data. The client web cache receives the data from the central server and based on the scripts or the one-time instruction, and caches the cache data, as instructed. The cache data may then be accessed by the client system.

9 Claims, 7 Drawing Sheets

CLIENT WEB CACHE

CROSS-REFERENCE TO RELATED APPLICATIONS

This application claims priority to and benefit from U.S. Provisional Patent Application Ser. No. 60/971,843, filed Sep. 12, 2007, and entitled "Web cache server," which application is incorporated herein by reference in its entirety.

BACKGROUND

1. The Field of the Invention

The present invention relates to transferring electronic data in a communications system. More specifically, the present invention relates to methods and systems for reducing latency for communications between a server and a remote client.

2. The Relevant Technology

Computers and computing systems affect nearly every aspect of modern living. Computers are generally involved in work, recreation, healthcare, transportation, entertainment, household management, etc. The functionality of computers has also been enhanced by their ability to be interconnected through various network connections.

Realizing the pervasive use of computer services, online service providers are constantly offering new services and upgrading existing services to enhance the online experience of their subscriber. Subscribers have on-demand access to news, weather, financial, sports, and entertainment services as well as the ability to transmit electronic messages and to participate in online discussion groups. For example, subscribers of online service providers (OSPs), such as AOL or CompuServe, may access web applications that are hosted by servers located throughout the world and retrieve information concerning a wide variety of topics from those servers. A server may be maintained by the service provider or by a third party provider who makes information and services available to the service provider through a worldwide network of computers.

Often, different services provided by OSPs must reside on different servers. Furthermore data relating to these services can be distributed on a number of different storage locations, since a single storage device would simply not have the capacity to store information for potentially millions of users. Thus, clients typically access server functionality from servers located in various geographic locations.

Internet users living in remote locations often suffer from high latency due to the long distances between themselves and the servers with which they communicate. Systems are needed for improving communication where a client system is separated from a web source or server system by a long distance.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method of storing data at a client web cache. The method may be practiced, for example, at a central server within a distributed network. The method includes receiving a data request from a client system and retrieving the requested data. At least a portion of the requested data is sent to the client system. Furthermore, the central server sends scripts to a client web cache to instruct the client web cache to store cache data as instructed by the scripts. The central server retrieves the cache data and sends the cache data to the client web cache either along with the requested data or in response to a subsequent request from the client web cache. In one embodiment, the cache data can include at least a portion of the requested data to be accessed by the client system in the future. However, the cache data can include, among other things, web application code, user-specific data, and the like, that may or may not have been specifically requested in the data request. In some cases, the cache data does not have to include the requested data.

Another embodiment described in more detail herein includes a distributed network system. The system includes a central server configured to receive data requests from a client system and to retrieve the requested data from the appropriate data source. The central server sends the requested data and/or scripts to a client web cache located in close proximity to or integrated with the client system. The scripts are used to instruct the client web cache to store cache data as instructed by the scripts. The client web cache is configured to receive the requested data and/or scripts sent by the central server, and to store the cache data as instructed by the scripts. The cache data can be sent along with the requested data, e.g., where the requested data is part of the cache data. Alternatively, the client web cache can send a subsequent request to the central server to request the cache data, e.g., where the cache data is not part of the requested data. The cache data may be accessed in the future by a subsequent data request from the client system.

Variations may also be made to the above embodiments. For example, one embodiment includes a method performed by a web server of caching user data. The example method includes receiving a one-time instruction set providing instructions to store a predefined type of user data at a client web cache. The one time instruction set may be hard coded, or may alternatively be received via a script sent by the central server. The method further includes receiving a data request from a client system and sending request for the data to the central server. The requested data is received from the central server, and the predefined type of user data, as provided by the one-time instruction set, is identified and stored in the client web cache as cache data for future access by the client system.

A further embodiment is directed to a method of retrieving cache data. The method may be practiced, for example, at a client web cache within a distributed network. The client web cache is located in close proximity to or integrated with a client system. The method includes receiving a data request from the client system, and sending the data request to the central server. The requested data is received from the central server, and may further be forwarded to the client system. The client web cache can also receive scripts from the central server instructing the client web cache to store cache data for future access by the client system. The client web cache stores the cache data as instructed by the scripts received from the central server.

The client web cache can then subsequently receive a data request from the client system, identifying at least a portion of the cache data. The client web cache retrieves at least a portion of the cache data and sends the requested cache data to the client system. In addition, the client web cache can make an update data request to the central server to retrieve any updated data that was identified in the data request, but was not satisfied by cache data at the client web cache. The central server receives the updated data request from the client web cache and retrieves at least a portion of the updated data. The central server then returns at least a portion of the updated data to the client. The central server can also generate scripting that identifies additional cache data (which may or may not include the updated data) to be stored on the client web cache, which stores the additional cache data.

The method for retrieving data can be modified based on whether the client web cache receives a one-time instruction set before the data request is received by the client web cache.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention provide for methods and systems for improving data access latency for a remote client. Example embodiments include local caches in close geographical proximity to client systems. When a client system requests data, the data request may be communicated to the central server. The central server retrieves and returns the requested data. The central server also identifies cache data that is likely to be accessed by the user in the future and utilizes client-side scripting for instructing the client web cache to store cache data so that it can be accessed in the future by a client system. The present invention reduces web access times for client systems by allowing the client web cache to locally store the cache data which is then accessible by the client system rather than having to request the cache data from a remote central server.

As used herein, the term "data" is used broadly to refer to information transmitted between a client system, client web cache, and/or central server. Requested data includes data that is specifically requested by client system and/or client web cache. Cache data includes data that is identified by central server as data that is likely to be accessed in the future and is identified in scripting generated by the central server. Cache data is any data that is intended to be cached by a client web cache, even if the data is not currently being stored on a client web cache. In some instances, cache data can, but does not have to include, requested data. Data can include, but is not limited to, web application data (both HTML and DHTML), user-specific data, protected data, authentication data, and the like.

Figure 1A:
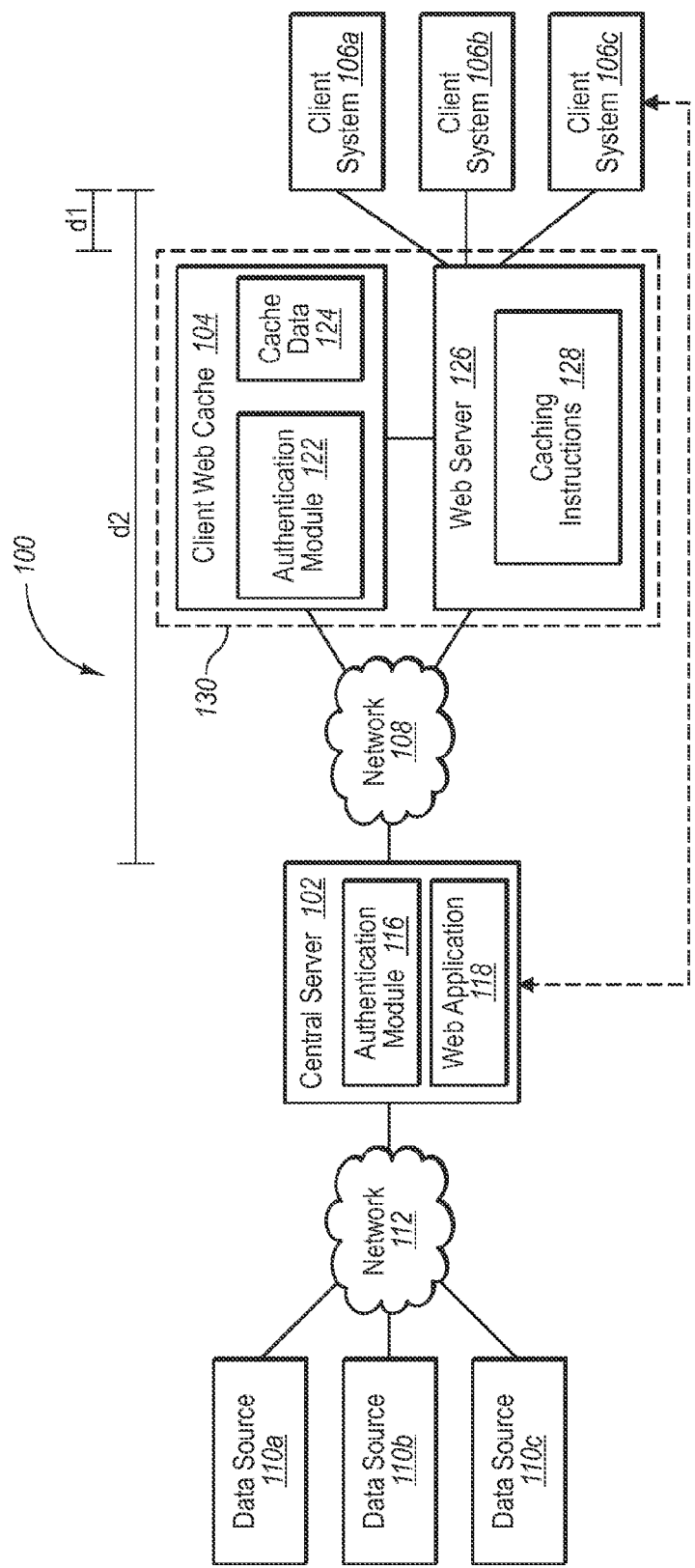
FIGS. 1A and 1B illustrate schematic diagrams of example distributed networks for improving data access latency.

Referring now to FIG. 1A, a more detailed example is illustrated using a diagrammed reference to an example distributed network, denoted generally at 100. The example distributed network 100 includes a central server 102 that communicates with one or more client web caches 104. The client web cache 104 will typically be located within close geographic proximity to one or more client systems 106*a-c*. The illustrated distributed network 100 further includes data sources 110*a-c*, which may be used for providing data to the central server 102. In the example distributed network 100, the client systems may communicate with the central server 102 by connecting to a web server 126. In one embodiment, the web server 126 and the client web cache 104 may be integrated into a single server, as indicated by the dotted box 130.

The central server 102 typically communicates with the data sources 110 over a network 112, and similarly communicates with the client web cache 104 over a network 108. The networks 108 and 112 may include, for example, the Internet, the World Wide Web, WANs, LANs, analog or digital wired and wireless telephone networks (e.g. PSTN, ISDN, or xDSL), radio, television, cable, satellite, and/or any other delivery mechanism for carrying data.

The central server 102 may be part of an online service provider ("OSP"), a host system, an electronic mail server, and the like. It will be appreciated that an OSP may have more than one central server to handle data requests from potentially millions of client systems 106. In general, the central server will examine a data request (e.g., an address field), use a mapping table to determine the appropriate destination (e.g., data source 110) for the data request, and direct the data request to the appropriate destination. In one embodiment, the requested data may be located on the central server 102. For example, central server 102 may host a web application 118 which may be accessed by a request from one or more client systems 106. Examples of web applications include, but are not limited to, instant messaging capabilities, email providers, online multimedia sources, and the like. In addition to hosting the web application 118, the central server 102 may store data related to the web application in other data sources 110.

The data sources 110 may include a variety of sources of data related to web application 118. For example, a data source 110 may be configured as a data server that stores data such as, but not limited to, user-specific data such as email data, instant messaging data, image content, video content, audio content, contact information, task information, journal information, and the like. In some cases, the user-specific data can be protected. As used herein, the term "protected data" refers to any data that requires authentication by a user to access said data. While data sources 110 are shown as separate from central server 102, in some cases, the data source 110 can be integrated with central server 102. For instance, the central server 102 may include an electronic mail server and the data sources 110a may be include storage locations for electronic mail.

The client systems 106 may include one or more general-purpose computers (e.g., personal computers), one or more special purpose computers (e.g., devices specifically programmed to communicate with each other and/or the central server 102), or a combination of one or more general purpose computers and one or more special purpose computers. The client system 106 may be arranged to operate within or in concert with one or more other systems, such as, for example, one or more Local Area Networks ("LANs") and/or one or more Wide Area Networks ("WANs").

The example distributed network 100 at least partially avoids delays inherent in the transmission of the electronic data to a remotely located client system 106. Repeatedly requested data may be stored and accessed directly from the "cache data" 124 in the client web cache 104 instead of being required to access the same data from central server 102 and/or data sources 110.

The illustrated distributed network 100 generally pertains to communications between a client system 106 through a proxy that is identified by the central server 102, and other communications initiated by or directed from the client system 106. Initially, the client system 106 may establish a connection to the central server 102 (as shown by the dashed line). As illustrated in FIG. 1A, in one embodiment, the client system 106 may establish a connection to the central server 102 via a web server 126. The central server 102 may include a login server to which the client system 106 makes a request for authentication to access a web application 118 and/or data stored on data source 110. An access request from the client system 106 may take many forms. For instance, an access request may be the initial communication from the client system 106 to the central server 102 or may be included in a subsequent communication between the client 106 and the central server 102. The central server 102 may use the authentication module 116 to determine whether to grant the access request.

Upon receiving an access request, the authentication module 116 may use an identifier such as the username and password, cookies, IP address of the client system 106, and the like, to determine relevant information (user preferences, demographic information) associated with the subscriber. Such relevant information may have been submitted previously by the subscriber or determined on the fly by the central server 102. The demographic information may include, but is not limited to, information about the geographic location (e.g., the country, state, city) where the subscriber access request originated, the current client software version, and the type of access device being used.

Using the relevant geographic location information, the central server 102 identifies a suitable client web cache 104 to which to direct the client for future requests for data related to web application 118. Identification of a suitable client web cache 104 may be based, for example, on whether a client web cache exists in the same geographic region as the client system 106, whether the client system 106 is able to use the client web cache, demographic information about user-preferred routing paths, and the relative locations of the client system 106 and the destination server. In general, the central server 102 may select a client web cache 104 that can communicate with the client system 106 in a more efficient manner than the central server 102 is able to communicate with the client system 106. Typically, a client web cache 104 is selected such that the distance 'd1' between the client web cache 104 and the client systems 106 is less than the distance 'd2' between the central server 102 and the client systems 106. Similarly, the web server 126 may be located closer to the client systems 106 than the central server 102. However, in certain circumstances, the client systems 106 may be located closer to the central server 102 than the selected client web cache 104, but may still communicate with the selected client web cache 104 more efficiently than with the central server due to communication delays that are unrelated to distance.

After the central server 102 identifies a client web cache 104 in a geographic region suitable for the client system 106 making the request, the central server 102 may direct the client system 106 to the identified client web cache 104. The central server 102 also may transmit subscriber information to the client web cache 104 to enable the client web cache to function as an OSP proxy capable of authenticating the user and tailoring the content and user interfaces for the individual client system 106. The client system 106 may then transmit subsequent Internet communications to the client web cache 104. The client web cache 104 will also be able to communicate with the central server 102, with communications being authenticated by authentication modules 116, 122, residing on the central server 102 and client web cache 104, respectively.

The web server 126 receives data from the central server 102 and stores cache data 124 in the client web cache 104 to be accessed in the future by the authorized client systems 106. The cache data 124 may include a variety of data types. For example, HTML and DHTML data may be stored for allowing the client systems 106 to render web pages. Cache data 124 may further include web application code, user-specific data, and the like, that may or may not have been specifically requested in the data request.

Furthermore, and in one embodiment, the example distributed network 100 may be configured to allow the client systems 106 to access protected user data directly from the client web cache 104. By storing the protected user data on the client web cache 104, the client systems 106 are able to access the protected data directly from the client web cache instead of being required to access the secure data via the central server 102. This can improve both data access times and data security because the protected data no longer must travel over the networks 108 and 112 each time the protected data is accessed by a client system 106. In order to provide secure access to the protected data, the client cache 104 and/or the central server 102 may utilize authentication modules 116 and/or 122 for authenticating the user prior to providing access to the protected data stored on the client web cache 104. The protected data may be communicated between the central server 102, the client web cache 104, and the client systems 106 using a secure authenticated protocol. Thus, the present embodiment may decrease latency of email access, as well as other types of protected data.

In the example illustrated in FIG. 1A, the web server 126 determines which of the data received from the central server 102 to store as cache data 124 by using caching instructions 128. The caching instructions 128 may include hard-coded instructions for which type of data to store as cache data 124. Therefore, the web server 126 may act as a special purpose device for caching the data identified by the caching instructions 128.

The caching instructions 128 may specify that a particular type of protected user data should be automatically stored as cache data 124. For instance, the web server 126 may be initially hard coded with caching instructions 128 specifying that all electronic mail data received from the central server 102 should be stored as cache data. Therefore, the web server 126 analyzes all subsequently received data from the central server 102 to detect the presence of electronic mail and store the detected electronic mail as cache data 124. The web server 126 may later be recoded to store calendar and address book data as cache data 124. From that point forward, the web server 126 analyzes all data received from the central server 102 to detect the presence of calendar and address book data and store the detected calendar and address book data as cache data 124.

In one embodiment, when one of the client systems 106 requests data, the client web cache 104 may determine if the data request can be satisfied by the cache data 124. If the cache data 124 already contains the requested data, the client web cache 104 may immediately retrieve the appropriate cache data 124 and return the cache data to the client system 106 without communicating with the central server 102, thereby decreasing access time for the client system 106.

However, if the client web cache 104 cannot satisfy the data request using data previously stored in cache data 124, in one embodiment, the request may be directed to the central server 102. The central server 102 retrieves the data from the appropriate data source 110 and returns the data to the web server 126. For example, the data request from the client system 106 may be for protected data located on data source 110 and related to web application 118 on the central server 102 which is not available on the client web cache 104. When the data is received by the web server 126, the web server 126 analyzes the received data, detects the presence of the data type as identified by the caching instructions 128, and stores the detected data as cache data 124 in the client web cache 104. The client system 106 may access the cache data 124 directly from the client web cache 104 at any point in the future without experiencing the data latency that may occur when accessing the data via the central server 102.

Figure 1B:
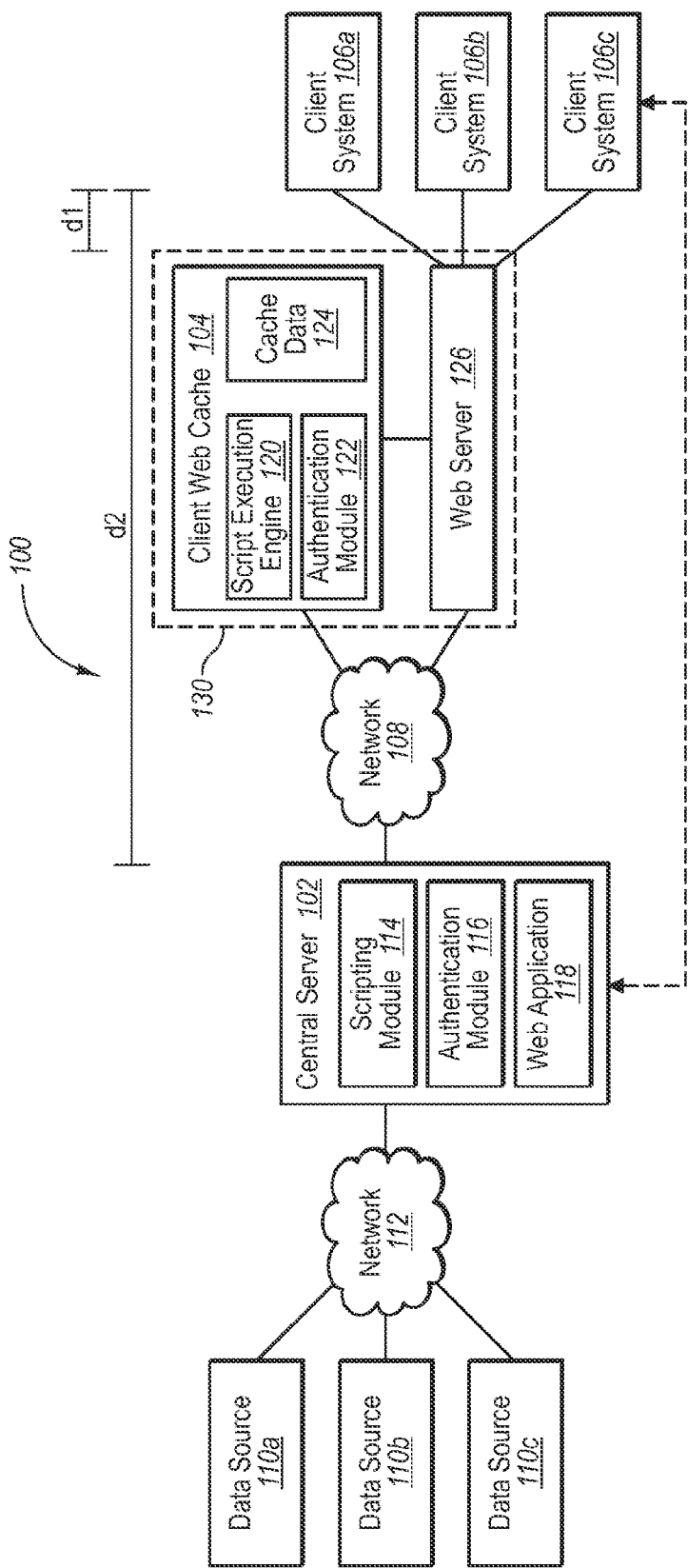

Referring now to FIG. 1B, in one embodiment, a scripting module 114 within the central server 102 may generate and send scripts to the client web cache and/or web server 130 for providing instructions as to which data to store locally in cache data 124. As described previously, the cache data 124 can be directly accessed in the future from client web cache 104 by the client systems 106. The client web cache 104 service may utilize a script execution engine 120 which executes scripts sent by the central server 102, causing the cache data 124 to be stored so that the data can be quickly and easily accessed by the client systems 106. In an alternative embodiment, the script execution engine 120 may be located at the web server 126, and the web server 126 may receive data from the central server 102 and make the determination as to which data to store as cache data 124.

In one embodiment, the central server 102 sends a one-time script to the client web cache and/or web server 130 to provide instructions as to which type of data to store as cache data 124. From that point forward, the web cache and/or web server 130 analyzes all data received from the central server to locate and store cache data 124 in accordance with the instructions provided by the one-time script. The caching instructions may be updated by the central server 102 by sending an additional one-time script to the web cache and/or web server 130 with new information regarding the data that should be stored as cache data 124. For instance, a first one-time script may be sent to instruct the web cache and/or web server 130 to cache all electronic mail data received from the central server 102. From that point forward, all electronic mail data is stored as cache data 124. Then, the central server 102 may send a second one-time script to instruct the web cache and/or web server 130 to also cache all contact information received from the central server. From that point forward, all electronic mail data and contact information will be stored as cache data 124. By utilizing the present embodiment of sending one-time script instructions, a user is not required to provide new hard-coded instructions each time the caching instructions 128 are to be updated, as was described in FIG. 1A.

In another embodiment, the scripting module 114 on the central server 102 dynamically controls the caching of data on the client web cache 104. The central server 102 utilizes the scripting module 114 to send a script instruction with each data transmission to instruct the web cache and/or web server 130 to store some or all of the data as cache data 124. The script execution engine 120 interprets each of the scripts received from the central server 102 and stores the appropriate data as cache data 124. When returning the requested data to the client web cache 104, the central server 102 may utilize server logic for determining data to be stored locally as cache data 124 at the client web cache 104. Therefore, the central server 102 may control the data being stored as cache data 124 in a real time fashion, and can alter the scripting instructs one a request by request basis to control the type of protected user data that is stored as cache data 124.

Figure 2:
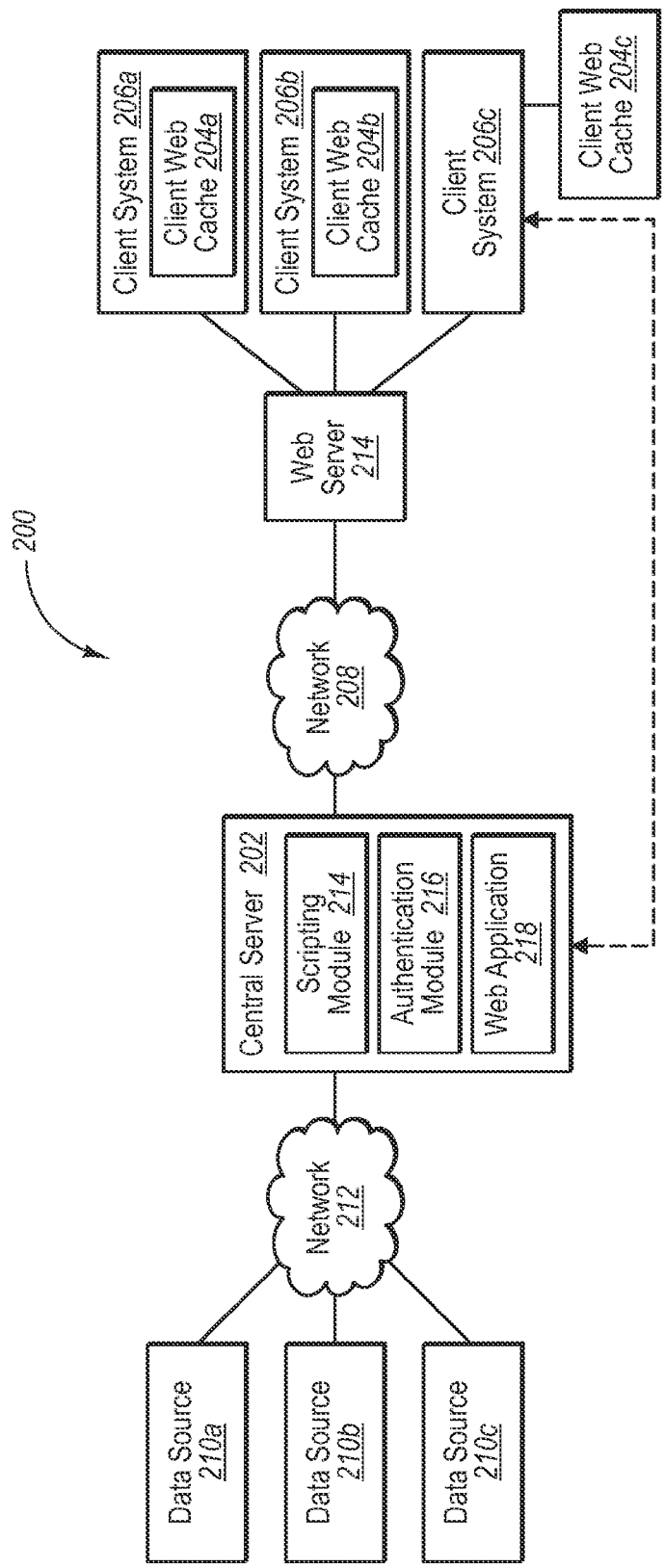
FIG. 2 illustrates a schematic diagram of another example distributed network for improving data access latency where client web caches are installed on client systems and/or coupled to the client systems.

As described in the embodiments illustrated in FIGS. 1A and 1B, in one embodiment, the client web cache 104 and the client systems 106a-c may be separate devices. However, in an alternative embodiment, illustrated in FIG. 2, a client web cache 204a-b may be integrated with each client system 206a-b, respectively. In addition, in another embodiment, the client web cache 204c may be configured as an appliance that plugs into the client system 206c such that a client web cache does not need to be installed at or near the web server 214 or within the client system 206. In the embodiment illustrated in FIG. 2, the central server 202 may send scripts directly to the client systems 206 via a network 208. The integrated and/or appliance client web cache 204 may execute the scripts to determine if data received from the central server 202 should be stored in local cache. When a client system 206 requests data, the integrated and/or appliance client web cache 204 may first determine if the data request may be satisfied locally prior to requesting the data from the central server 202. Although not shown, the client web caches 204a-c may each include a script execution engine, an authentication module, and cache data, similar to that illustrated in the client web cache 104 of FIG. 1.

Figure 3:
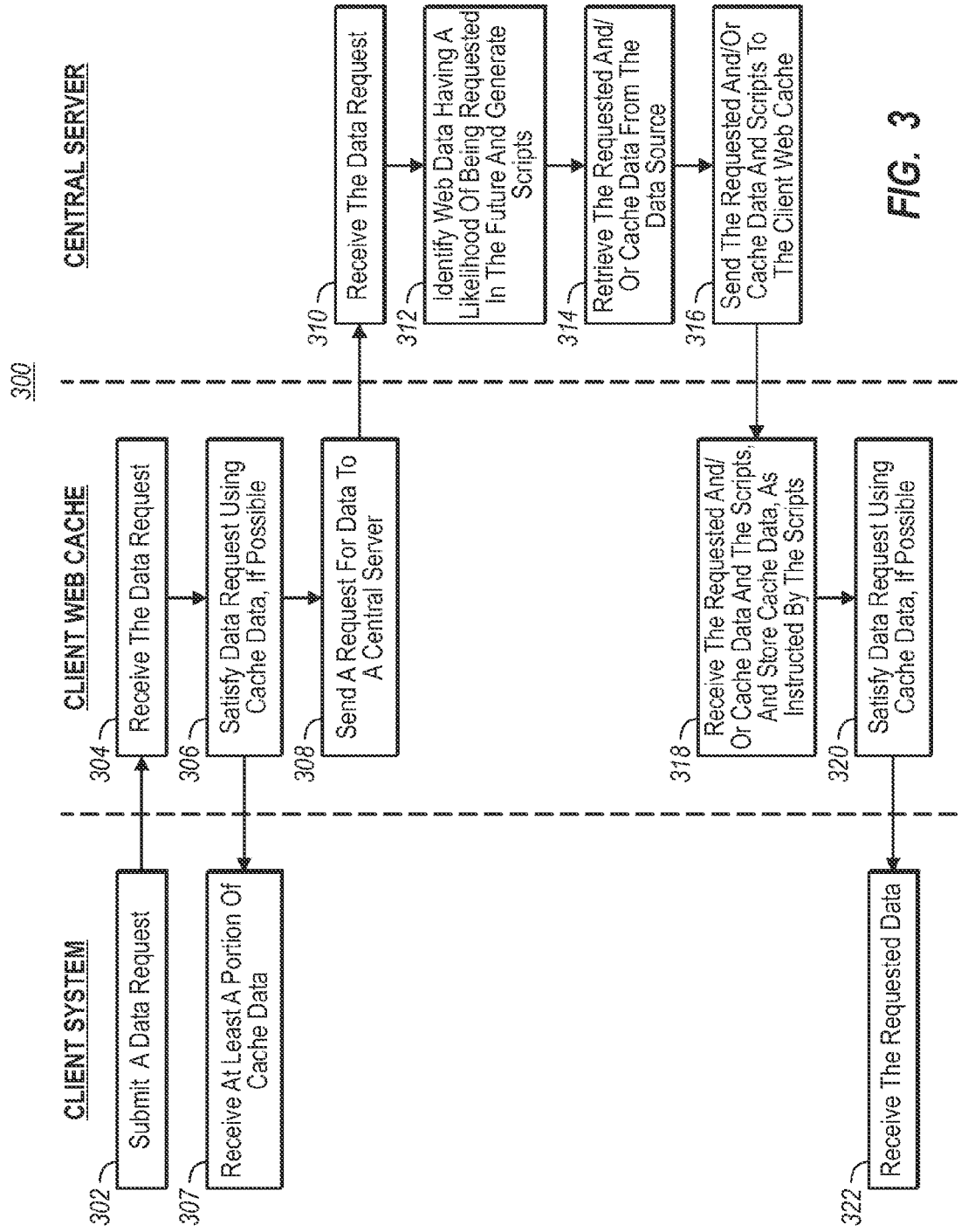
FIG. 3 illustrates a flow diagram of the communication between a central server, client web cache, and client system.

FIG. 3 illustrates one embodiment of a method 300 for caching data at a client web cache 104 and/or 204. While FIG. 3 illustrates the client system and client web cache as separate, as discussed above, the client web cache can be integrated into the client system. The method 300 begins, at 302, when a client system 106 submits a data request to the client web cache 104. (This assumes that at some point prior, the central server 102 has identified to client system 106 the identity of client web cache 104 based on factors such as geographic location of the client system.) The client web cache 104 receives 304 the data request and, if possible, will satisfy 306 the data request using cache data 124. As described in further detail below in FIG. 5, the client web cache 104 may satisfy the request immediately by determining if the requested data is already stored in cache data 124, and, if so, returning the requested data to the client system 106. At 307, the client system 106 receives at least a portion of the cache data 124. If the client web cache 104 is unable to satisfy at least a portion of the original data request using cache data 124 at 306, then the client web cache 104 will proceed to send 308 a request for the remaining data to the central server 102.

The central server 102 receives 310 the data request from the client web cache 104. At 312, the central server 102 utilizes server logic to identify data having a likelihood of being requested in the future based on the data request. The central server 102 then generates scripting that instructs client web cache 104 to store cache data that is identified in the scripting. For example, when a client system 106 requests the first page of a website, the central server 102 may also identify the remaining pages of the website because of a high likelihood that the client system will request the remaining pages in the future. The remaining pages are identified even though the client system 106 has not yet requested them. In this example, the central server 102 may thus identify the requested page and remaining pages as "cache data" that will eventually be stored at a client web cache 104. In another example, when the client system 106 requests access to a user's email service. Along with processing this initial access request, the central server 106 may identify all email messages in the user's inbox, or alternatively all new messages, as "cache data" even though only initial access to the user's email service was requested.

Once cache data is identified by the central server 102, the cache data can be delivered to client web cache 104 in various ways. Ultimately, the scripting from the central server 102 will instruct the client web cache 104 to store the cache data. FIG. 3 illustrates one example of how the scripting from central server 102 is used to store cache data onto client web cache 104. At 314, the central server 102 retrieves the requested data from the data source. Retrieving the data may include retrieving the data specifically requested by the client system 106 as well as the data identified by the central server 102 as having a high likelihood of being requested the future.

Thus, to continue the above examples, in addition to retrieving a requested first webpage, the central server 102 may further retrieve the remaining identified webpages of the website. Note in this example, the "cache data" may be both the requested first webpage and the additional webpages of the website, even though the "requested data" is only the first webpage that is rendered on the client system 106. Similarly, in addition to requesting access to the user's email service, the central server 102 may also retrieve the other identified email messages within the user's inbox. In this particular example, the "cache data" may be the user's email messages, while the "requested data" was simply the authentication to access the user's email service.

The central server 102, at 316, sends the requested and/or cache data and scripts to the client web cache 104. The requested and/or cache data and the scripts are received 318 by the client web cache 104. The client web cache 104 interprets the scripts, which contain instructions to store data identified as "cache data" locally as cache data 124. The appropriate data is stored in cache data 124, and the client web cache 104 sends 320 the requested data to the client system 106. Finally, at 322, the client system 106 receives the requested data.

Based on other embodiments described herein, FIG. 3 could also be modified to include prior hard coding of a web server to include caching instructions, sending a prior one-time scripting to a client web cache and/or web server. In addition, the client web cache can be located at or near a web server and/or at or near a client.

Figure 4:
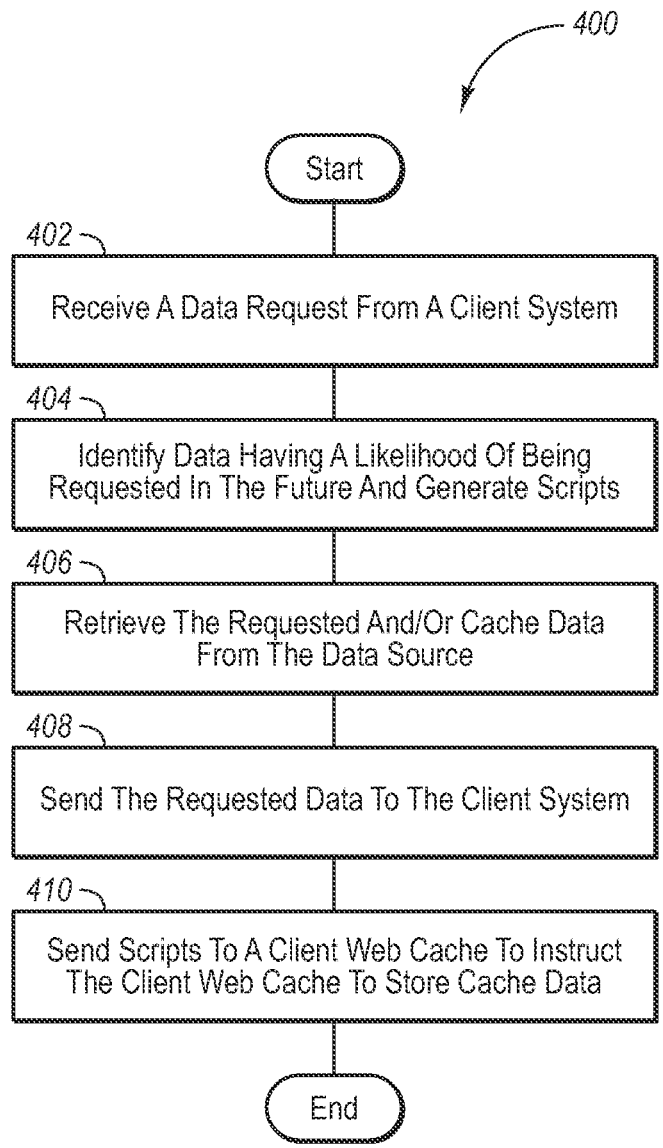
FIG. 4 illustrates a flow diagram of one example of a method for storing data at a client web cache.

FIG. 4 illustrates one embodiment of an aspect of a method 400 that can be, for example, implemented at a central server and used for storing data at the client web cache. The method 400 may be practiced, for example, in a distributed computer system including a central server and a client web cache. The central server system may include one or more computer-readable media having computer-executable instructions, that when executed, implement the method 400.

The method 400 includes, at 402, receiving a data request from a client system. Referring once again to FIG. 1, an illustrative example of a distributed computer system 100 is provided. A client system sends a request for data. In one embodiment, the data request is received directly from the client system. Alternatively, the data request could have been routed through client web cache to the central server. Where the data request goes through the client web cache and the client web cache is able to satisfy at least part of the data request, the data request received at the central server may be altered from the original data request of the client system. As described previously, in one embodiment, the client web cache is located within close geographical proximity, d1, to the client system in relation to the distance, d2, between the central server and the client system. In an alternative embodiment, illustrated in FIG. 2, the client web cache is integrated with the client system.

At 404, the method 400 further includes utilizing server logic to identify data having a likelihood of being requested in the future based on the data request. As described previously, this may include identifying additional webpages, web application code, user-specific data, and the like, that may not have been specifically requested in the data request received from the client. The central server generates scripts that identify the cache data, which may or may not include the data included in the data request.

At 406, the method 400 also includes retrieving the requested and/or cache data. At 408, the method 400 further includes sending the requested data to the client system. As illustrated in the FIG. 1 example, the requested data may be sent to the client system via the client web cache. The central server further sends scripts to a client web cache to instruct the client web cache to store cache data for future retrieval by the client system. The client web cache interprets the scripts, and saves the appropriate cache data. The cache data may include part or all of the data retrieved by the central server, including at least a portion of the requested data, the additional data determined as likely to be requested in the future, as well as other web application data, user-specific data, and the like.

It will be appreciated that 408 and 412 can be performed in a different order. It will further be appreciated that another mechanism for sending the cache data to the client system is, at 406, for the client server to only retrieve the requested data and to send the scripts along with the requested data to the client web cache. At 408, the client web cache forwards the requested data to the client system. Simultaneously, the client web cache uses the scripts to make requests to the central server to retrieve the cache data (if the requested data does not contain the cache data) and stores the cache data, which process is transparent to the user.

Figure 5:
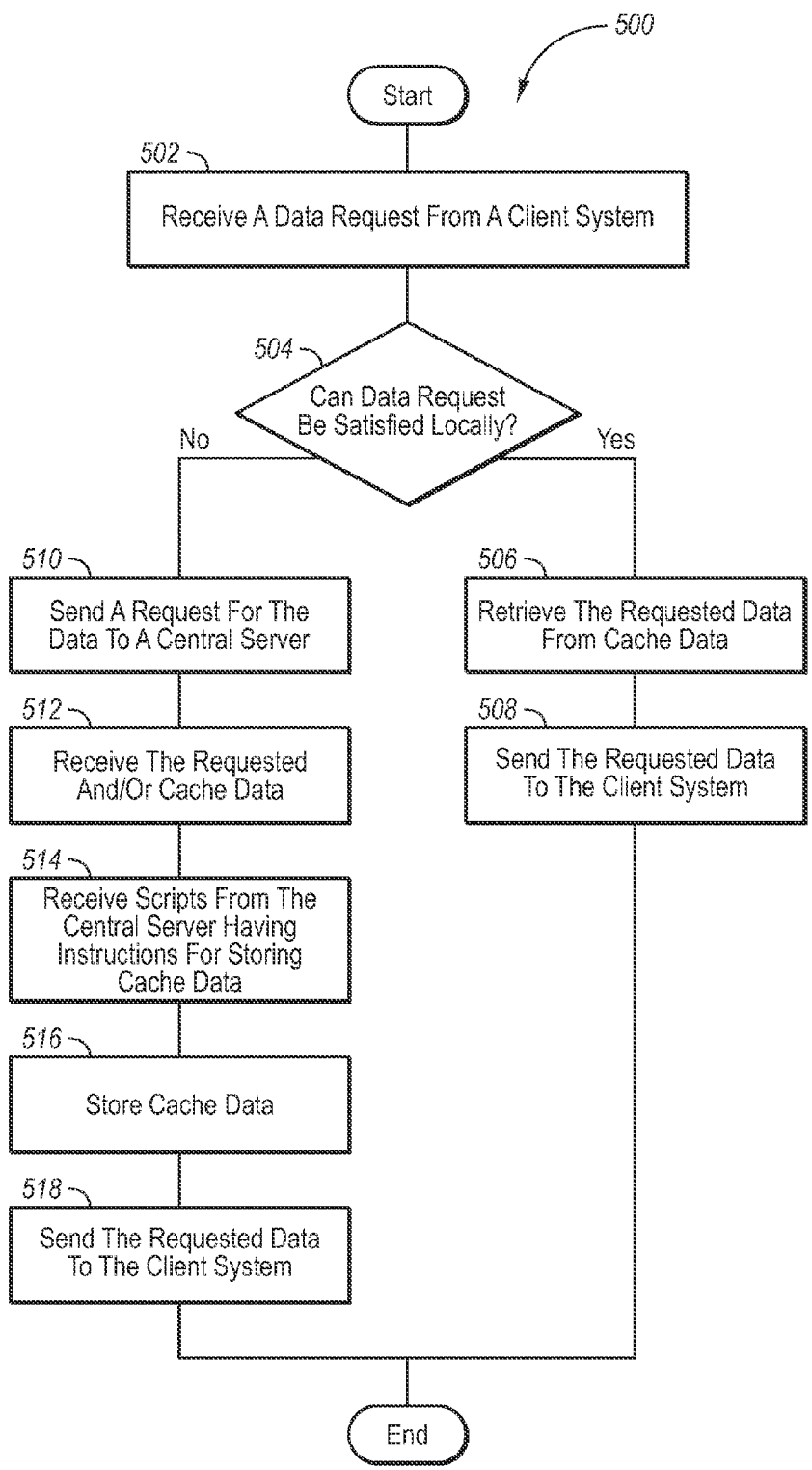
FIG. 5 illustrates a flow diagram of one example of a method for retrieving data.

Referring now to FIG. 5, a method 500 is illustrated of obtaining scripting and storing cache data which can be implemented, for example, at the client web cache. The method 500 may be practiced, for example, in client web cache within a distributed network. The client web cache may be located in close geographic proximity to a client system, or may be integrated within the client system. The client web cache may include one or more computer-readable media having computer-executable instructions, that when executed, implement the method 500.

The method 500 includes, at 502, receiving a data request from the client system. Upon receiving the data request, the method 500 includes, at 504, determining whether the data request can be satisfied locally by cache data stored at the client web cache. If the requested data is already stored in the cache data from a previous request by the client system, the method 500 includes, at 506, retrieving the requested data from the cache data and, at 508, sending the requested data to the client system.

However, if the data request cannot be satisfied locally at the client web cache, the method 500 further includes, at 510, sending a request for the data to a central server. In one embodiment, sending the request for the data to a central server includes redirecting the data request received from the client system to the central server. In cases where the data request from the client system can only partially be satisfied by data in cache data, the request to the central server may be modified from the original data request received from the client system.

The method 500 further includes, at 512, receiving the requested and/or cache data from the central server. In one embodiment, receiving the requested data from the central server further includes receiving additional cache data from the central server, the additional cache data representing data having a likelihood of being requested in the future by the client system. As described previously in reference to the method 400 in FIG. 4, the determination of which data is likely to be requested in the future by the client system may be made by the central server system.

At 514, the method 500 also includes receiving scripts from the central server. The scripts instruct the client web cache to store cache data for future access by the client system. The cache data may include all or part of the data received from the central server. The client web cache interprets the scripts received from the central server, and, at 516, stores the cache data, as instructed by the scripts from the central server. In one embodiment, the method is capable of storing user data which is protected from non-authorized browsing or searching in the cache data. Therefore, a user of the client system is capable of accessing protected data, such as email, directly from the cache data. By storing the protected data in the cache data, the latency of accessing the protected data is improved. In order to adequately protect the protected data, the method 500 may further include receiving authentication data from the client system prior to providing the client system access to the protected data stored in client web cache. In addition to storing the data in the local cache, client web cache further, at 518, sends the requested data to the client system.

Blocks 514, 516, 518 can be performed in a different order depending on the configuration of the client web cache. For example, where the client web cache is configured as an appliance, the client may receive 512 the requested and/or cache data. The requested data may first be sent 518 to the client to be rendered on a display. After immediately displaying the requested data, the client web cache may receive 514 the scripts from the central server containing instructions for storing the cache data, and may then store 516 the cache data. As such, the requested data can be rendered more quickly to a user by not having to wait until cache data is processed and stored at the client web cache.

Referring back to 506 and 508, if the data can only be partially satisfied by the cache data, the method may include sending a request for obtaining updated data. Alternatively, periodically, the client web cache may communicate with the central server to update the cache data stored at the client web cache. In order to maintain updated cache data, the method 500 may further include sending a request for updated cache data to the central server. The client web cache receives the updated cache data, as well as additional scripts from the central server. The client web cache interprets the scripts, which may provide instructions for synching existing cache data with the updated cache data. The updated cache data can then be directly accessed by a client system.

Figure 6:
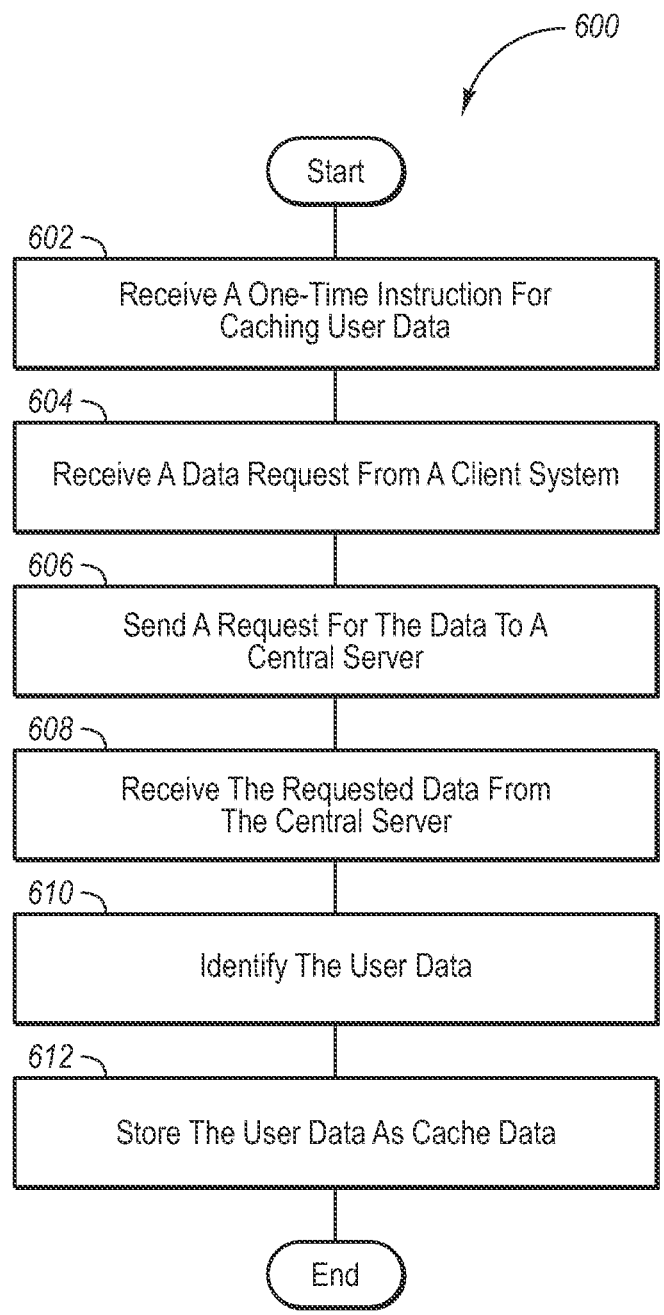
FIG. 6 illustrates a flow diagram of one example of a method for caching user data.

FIG. 6 illustrates one embodiment of an aspect of a method 600 for caching user data. The method 600 may be practiced, for example, in a distributed computer system including a central server, a web server and a client web cache. The client web cache and the web server may be located within close proximity to the client system, in comparison to the distance between the client system and the central server. The web server receives 602 a one-time instruction providing instructions to cache a predefined type of user data at the client web cache. For instance, the one-time instruction may instruct the web server to store user data, such as electronic mail, calendar data, user preferences data, contact information, and the like as cache data. The central server may include an electronic mail server or other server for providing user data.

In one embodiment, receiving 602 a one-time instruction further includes hard-coding the web server to cache a predefined type of user data at the client web cache. By hard-coding the instruction set at the web server, no subsequent instructions need to be sent to the web server as to the data that should be stored as cache data. In an alternative embodiment, receiving 602 a one-time instruction further includes receiving a one-time script configuration from the central server for providing instructions to cache the predefined type of user data at the client web cache. The web server can execute the script received from the central server a single time for determining which data to cache during all subsequent data transmissions, until another script is received from the central server to provide new caching instructions. Further, receiving 602 a one-time instruction can be applied to the embodiment where the client web cache has an appliance configuration.

The client web cache (whether located at the web server or as an appliance to the client) receives, at 604, a data request from a client system. For instance, the client may request user data, such as email, calendar data, and the like. If the client web cache is unable to fulfill the data request, the client web cache forwards the request to the web server, which sends, at 606, a request for the data to a central server.

The central server fetches the requested data and returns the data to the web server. The web server receives the requested data, at 608, from the central server. If the client web cache is located at or near the web server, the client web cache identifies the predefined type of user data, as provided by the one-time instruction, as denoted at 610. Finally the client web cache stores, at 612, the identified user data in the client web cache as cache data for future access by the client system. The web server then forwards the requested data to the client.

If the client web cache is configured as an appliance that plugs into the client, the web server forwards the requested data to the client such that the client receives 608 the requested data from the central server. The client can then render the requested data on a display. The client web cache at the client then identifies 610 the predefined type of user data, as provided by the one-time instruction. Finally, the client web cache stores 612 the identified user data in the client web cache as cache data for future access by the client system.

Once the user data is stored as cache data, the client system may access the user data directly from the client web cache at a later time. The method may further include steps for authenticating the user to ensure that an unauthorized user does not access the protected user data.

In one embodiment, the client web cache can update the cache data to ensure that the cache data contains current information. For example, the client web cache may send a request for updated cache data to the central server and receive the updated cache data from the central server. Then the client web cache may sync the existing cache data with the updated cache data received from the central server.

Embodiments included general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for caching data in a distributed web cache environment including a web cache computer, a central server computer, one or more client systems, and one or more data sources, the method being performed by the central server computer and comprising:
    receiving a data request from a client system, the data request requesting data stored at a data source; and
    in response to receiving the data request from the client system:
        retrieving the requested data from the data source;
        identifying data other than the requested data based on a likelihood of the other data being requested in the future by the client system;
        retrieving the other data that has a likelihood of being requested in the future by the client system from the one or more data sources;
        selecting the web cache computer from among a plurality of available web cache computers such that the distance between the client system and the web cache computer is less than the distance between the web cache computer and the central server computer;
        sending, to the client system, the requested data;
        sending, to the web cache computer, the other data that has a likelihood of being requested in the future by the client system;
        generating a one-time executable script instructing the web cache computer to cache all protected user data of a specified type retrieved from the central server; and
        sending the generated executable script from the central server computer to the web cache computer, wherein the web cache computer is intermediate the central server computer and the client system and is remote from the central server computer and from the client system, and the executable script is configured to cause the web cache computer to cache the protected user data of a specified type retrieved from the central server for access by the client system, the specified type comprising at least one of email, calendar data, and address book data.

2. The method as recited in claim 1, wherein data communication latency between the client system and the intermediate web cache computer is shorter than data communication latency between the client system and the central server computer.

3. A method for storing cache data configured to be accessible by a client system, the method being performed by a web cache computer located in close proximity to a client system and comprising:
    receiving a data request from the client system;
    sending a request for the data to a central server, the web cache computer being intermediate a central server and the client system, the web cache computer being remote from the central server and remote from the client system;

receiving the requested data from the central server;

receiving data other than the requested data that has a likelihood of being requested in the future by the client system;

receiving executable scripts at the web cache computer from the central server, the executable scripts instructing the web cache computer to store protected user data of a specified type received from the central server for future access by the client system, the specified type comprising at least one of email, calendar data, and address book data; and storing the protected user data received from the central server in cache, in response to executing the executable scripts received from the central server.

4. The method as recited in claim 3, further comprising sending the requested data to the client system.

5. A central server computer in a distributed network for storing data at a web cache, the central server computer comprising:

a communication device configured to receive a data request from a client system over the network;

one or more processing modules configured, in response to receiving the data request from the client system, to:

retrieve the requested data from a data source on the network;

identify data other than the requested data based on a likelihood of the other data being requested in the future by the client system;

retrieve the other data that has a likelihood of being requested in the future by the client system;

select a web cache computer from among a plurality of available web cache computers such that the distance between the client system and the web cache computer is less than the distance between the web cache computer and the central server computer;

send, to the client system, the requested data and the other data that has a likelihood of being requested in the future by the client system; and send executable scripts from the central server computer to the web cache computer to cause the web cache computer to store protected user data of a specified type retrieved from the central server, such that the protected user data is accessible by the client system, the specified type comprising at least one of email, calendar data, and address book data.

6. The central server computer of claim 5, wherein data communication latency between the client system and the intermediate web cache computer is shorter than data communication latency between the client system and the central server computer.

7. The central server computer of claim 5, wherein the one or more processing modules are further configured to send the requested data to the client system over the network.

8. A web cache computer within a distributed network, the web cache computer located in close proximity to a client system for storing cache data configured accessible by the client system, the web cache computer comprising:

a communication device for receiving a data request from the client system; and one or more processing modules configured to:

send a request for the data to a central server, the web cache computer being intermediate the central server and the client system and being remote from the central server and from the client system;

receive the requested data from the central server;

receive data other than the requested data that has a likelihood of being requested in the future by the client system;

receive executable scripts at the web cache computer from the central server, the executable scripts instructing the web cache computer to store protected user data of a specified type retrieved from the central server for future access by the client system, the specified type comprising at least one of email, calendar data, and address book data; and execute the executable scripts received from the central server to store the protected user data in cache.

9. The web cache computer of claim 8, wherein the one or more processing units are further configured to send the requested data to the client system.

* * * * *